US009708943B2

(12) United States Patent
Raab et al.

(10) Patent No.: US 9,708,943 B2
(45) Date of Patent: Jul. 18, 2017

(54) DEVICE FOR DELIVERING COMPRESSED AIR FOR PNEUMATICALLY OPERATED EQUIPMENT IN MOTOR VEHICLES

(71) Applicant: MAN Truck & Bus Oesterreich AG, Steyr (AT)

(72) Inventors: Gottfried Raab, Perg (AT); Franz Leitenmayr, Perg (AT); Heidrun Klinger, Steyr (AT)

(73) Assignee: MAN TRUCK & BUS OESTERREICH AG, Steyr (AT)

( * ) Notice: Subject to any disclaimer, the term of this patent is extended or adjusted under 35 U.S.C. 154(b) by 185 days.

(21) Appl. No.: 14/242,113

(22) Filed: Apr. 1, 2014

(65) Prior Publication Data

US 2014/0299079 A1  Oct. 9, 2014

(30) Foreign Application Priority Data

Apr. 9, 2013  (AT) ...................... 266/2013

(51) Int. Cl.
| F01L 13/06 | (2006.01) |
| F04B 35/00 | (2006.01) |
| F04B 27/00 | (2006.01) |
| F04B 35/01 | (2006.01) |
| F01L 1/18 | (2006.01) |
| F02D 13/02 | (2006.01) |
| F02D 17/02 | (2006.01) |

(52) U.S. Cl.
CPC ............... *F01L 13/06* (2013.01); *F01L 1/181* (2013.01); *F02D 13/0276* (2013.01); *F04B 27/00* (2013.01); *F04B 35/00* (2013.01); *F04B 35/01* (2013.01); *F02D 17/023* (2013.01); *Y02T 10/18* (2013.01)

(58) Field of Classification Search
CPC ......... F01L 13/06; F01L 13/065; F01L 1/181; F02D 9/06; F02D 13/0276; F04B 41/04; F04B 27/00; F04B 35/00; F04B 35/01
See application file for complete search history.

(56) References Cited

U.S. PATENT DOCUMENTS

| 3,958,900 A  *  5/1976  Ueno ...................... F01L 13/06 | |
| | 123/198 F |
| 2006/0081213 A1*  4/2006  Yang ...................... F01L 1/181 | |
| | 123/321 |

FOREIGN PATENT DOCUMENTS

| DE | 891361 C | 9/1953 |
| DE | 19902052 A1 | 7/2000 |
| GB | 699182 A | 11/1953 |

OTHER PUBLICATIONS

Austrian Office Action.

* cited by examiner

*Primary Examiner* — Jacob Amick
(74) *Attorney, Agent, or Firm* — Lucas & Mercanti, LLP

(57) ABSTRACT

A device for delivering compressed air for pneumatically operated equipment in motor vehicles, in particular of brake systems in commercial vehicles, whereby compressed air can be tapped via a controllable valve from the combustion chamber of at least one cylinder of an internal combustion engine, includes a valve arranged outside the combustion chamber and connected to the combustion chamber, in particular via a connecting passage which opens into the combustion chamber.

27 Claims, 4 Drawing Sheets

DEVICE FOR DELIVERING COMPRESSED AIR FOR PNEUMATICALLY OPERATED EQUIPMENT IN MOTOR VEHICLES

CROSS-REFERENCE TO RELATED APPLICATIONS

This application claims the priority of ATA 266/2013 filed Apr. 9, 2013, which is incorporated by reference herein.

BACKGROUND OF THE INVENTION

The present invention relates to a device for delivering compressed air for pneumatically operated equipment in motor vehicles, in particular of brake systems in commercial vehicles. The invention further relates to a vehicle including the device and to a method using the device.

A possible way of supplying compressed air to, for example, the brake system of commercial vehicles consists in using the internal combustion engine directly or additionally as a compressor in defined operating states and operating cycles in which usable overpressure is present in the combustion chamber of at least one cylinder. A problematic aspect of such use, however, is that, if pressure is to be tapped directly from the combustion chamber, the gas exchange as such must not be adversely affected and the desired concept of the combustion chamber configuration must be preserved.

BRIEF SUMMARY OF THE INVENTION

It is therefore the object of the invention to propose a device for delivering compressed air that taps compressed air directly from the combustion chamber of at least one cylinder of the internal combustion engine, and does not adversely affect said engine structurally or in terms of gas dynamics and which can be implemented in a constructionally simple manner.

It is proposed according to the invention that the valve through which compressed air is tapped is arranged outside the combustion chamber and, in particular, is connected to the combustion chamber via a connecting passage which opens into the combustion chamber. The proposal makes possible an arrangement of the valve which is favourable both constructionally and with regard to manufacture, while in addition the combustion chamber configuration of the at least one cylinder can be retained practically unchanged. The mouth of the connecting passage can be configured relatively freely and can be positioned in a combustion chamber surface.

In particular, the valve in the cylinder head of the internal combustion engine may be set back or offset from the combustion chamber surface on the cylinder head side, and/or may be connected to the combustion chamber in a flow-promoting matter via the connecting passage. In this case the connecting passage may preferably be in the form of a bore.

Furthermore, the valve may be aligned substantially parallel to gas exchange valves of the internal combustion engine, especially if the gas exchange valves and the valve are arranged parallel to the central axis of the at least one cylinder of the internal combustion engine. This results, inter alia, in constructional and manufacturing advantages when producing and machining the, for example cast, cylinder head.

The valve is preferably connected to an outflow channel which can conduct compressed air according to the particular position of the valve and which therefore forms a valve-controlled outflow channel.

In order to achieve a constructionally advantageous and simple outflow of the compressed air to be discharged from the combustion chamber, the outflow channel controlled via the valve may open (bending through approximately 90°, for example) into a lateral face of the cylinder head, where it may be connected to a pressure line having a non-return valve.

In addition, in an advantageous embodiment of the invention the valve may be controlled mechanically and/or electrically and/or hydraulically and/or pneumatically via an actuating device. In this case the control may be effected as required and/or in dependence on defined or prescribed operating states of the internal combustion engine (especially with exhaust-gas free overpressure in the combustion chamber) and/or in coasting mode or engine-braking mode.

In a first control system of mechanical design the valve may be opened temporarily by means of an engine-driven camshaft and an actuating element. A control element which is activated, for example, electrically, hydraulically and/or pneumatically and which holds the valve open constantly may preferably be able to override the actuating element.

In this case the actuating element may preferably be a camshaft-driven two-armed rocker lever the arms of which, corresponding to the valve and to the cam of the camshaft, can be acted upon alternately with pressure medium via positioning elements, for example piston-cylinder units, as control elements. Such piston-cylinder units may be actuated hydraulically and/or pneumatically, for example.

Alternatively, the actuating device for the valve may be a piston-cylinder unit having at least one piston which urges the valve, which is preloaded to the closed position by a valve spring, in the opening direction and/or in the closing direction, for example hydraulically or pneumatically. Depending on different operating states of the internal combustion engine, the at least one piston may be connected alternately to corresponding pressure medium sources and/or control valves.

According to an embodiment of the invention, a piston of the piston-cylinder unit is guided displaceably in a cylinder liner, a respective pressure chamber being formed on each side of the piston. On the side of the piston facing towards the valve a spring device, preferably a compression spring, most preferably a helical compression spring, is arranged, preferably in a spacer sleeve, which spring device bears indirectly or directly against the cylinder liner and acts with its other end on the valve. The pre-tensioning force of this spring device is designed such that it is greater or stronger than the force of the valve spring which preloads the valve to the closed position. In addition, the pre-tensioning force of this spring device is designed such that it can be moved out of engagement, preferably can be compressed, during the compression stroke prior to ignition of the fuel and above a defined combustion chamber pressure, so that the valve can be closed by means of the valve spring. Such a structure can be produced simply and benefits, above all, from very high operating reliability.

According to another embodiment with regard to this arrangement, it may additionally be provided that the spring device acts on the valve via a lost-motion cap, or via a lost-motion cap together with an associated support cup on the valve side. The lost-motion cap is preferably mounted displaceably on an actuating rod connected to the piston, and is couplable to said actuating rod in such a way that, upon pressurisation of a lower piston chamber (in relation to the valve side) and a resulting displacement of the piston away from the valve, the lost-motion cap is moved away from the valve and the spring device is thereby moved out of operative engagement, whereby the valve can be closed by the force of the valve spring.

Upon pressurisation of an upper piston chamber (in relation to the valve side), or with the upper and lower piston chambers unpressurised, displacement of the lost-motion cap by means of the spring device relative to the actuating rod is enabled, so that the spring device is able to pretension the lost-motion cap in the direction of the valve and can therefore act on the valve, so that the valve is opened against the force of the valve spring. In this case, upon pressurisation of the upper piston chamber, the valve is continuously open for the duration of this pressurisation. With the upper and lower piston chambers unpressurised, by contrast, the valve is open only until a defined high combustion chamber pressure is reached during the compression stroke of the internal combustion engine prior to ignition of the fuel, which high pressure closes the valve against the force of the spring device.

In a further embodiment of the actuating device, the piston-cylinder unit may have two pistons which can be subjected to pressure in opposite directions. In this case the one piston may, for example, be suitably acted upon to hold the valve constantly open in defined operating states of the internal combustion engine, in particular in coasting mode and/or engine-braking mode of the motor vehicle, and the other piston may open the valve periodically in dependence on defined operating cycles, or on operating cycles predefinable in a specified manner, of the internal combustion engine.

According to an especially preferred embodiment with regard to this arrangement, a pressure chamber may be arranged and formed between the two pistons in such a way that, upon pressurisation of the pressure chamber, the lower piston can be displaced in the direction of the valve, preferably until the lower piston comes into abutment against a defined stop. In addition, a spring device, preferably a compression spring, most preferably a helical compression spring, bears against the side of the lower piston oriented towards the valve and acts on the valve, the pre-tensioning force of the spring device being greater than that of a valve spring which preloads the valve to the closed position. In addition, the pre-tensioning force of the spring device is designed such that, during the compression stroke of the internal combustion engine, the spring device can be brought out of engagement and, in particular, can be compressed, prior to ignition of the fuel and above a defined combustion chamber pressure, so that the valve can be closed by means of the valve spring. With such a structure, an alternative actuating device with greater functional reliability is also made available. The two pistons may in this case be accommodated and arranged in the piston-cylinder unit in such a way that the spring device is inactive in the unpressurised state and the valve is closed by means of the pre-tensioning force of the valve spring.

The advantages arising in connection with the vehicle and the method have also been previously explained in detail in connection with the detailed explanation of the device according to the invention, so that reference is made in this regard to the previous exposition.

BRIEF DESCRIPTION OF THE DRAWINGS

Several exemplary embodiments of the invention are explained in more detail below with reference to the appended schematic drawing, in which.

DETAILED DESCRIPTION OF THE INVENTION

Figure 1:
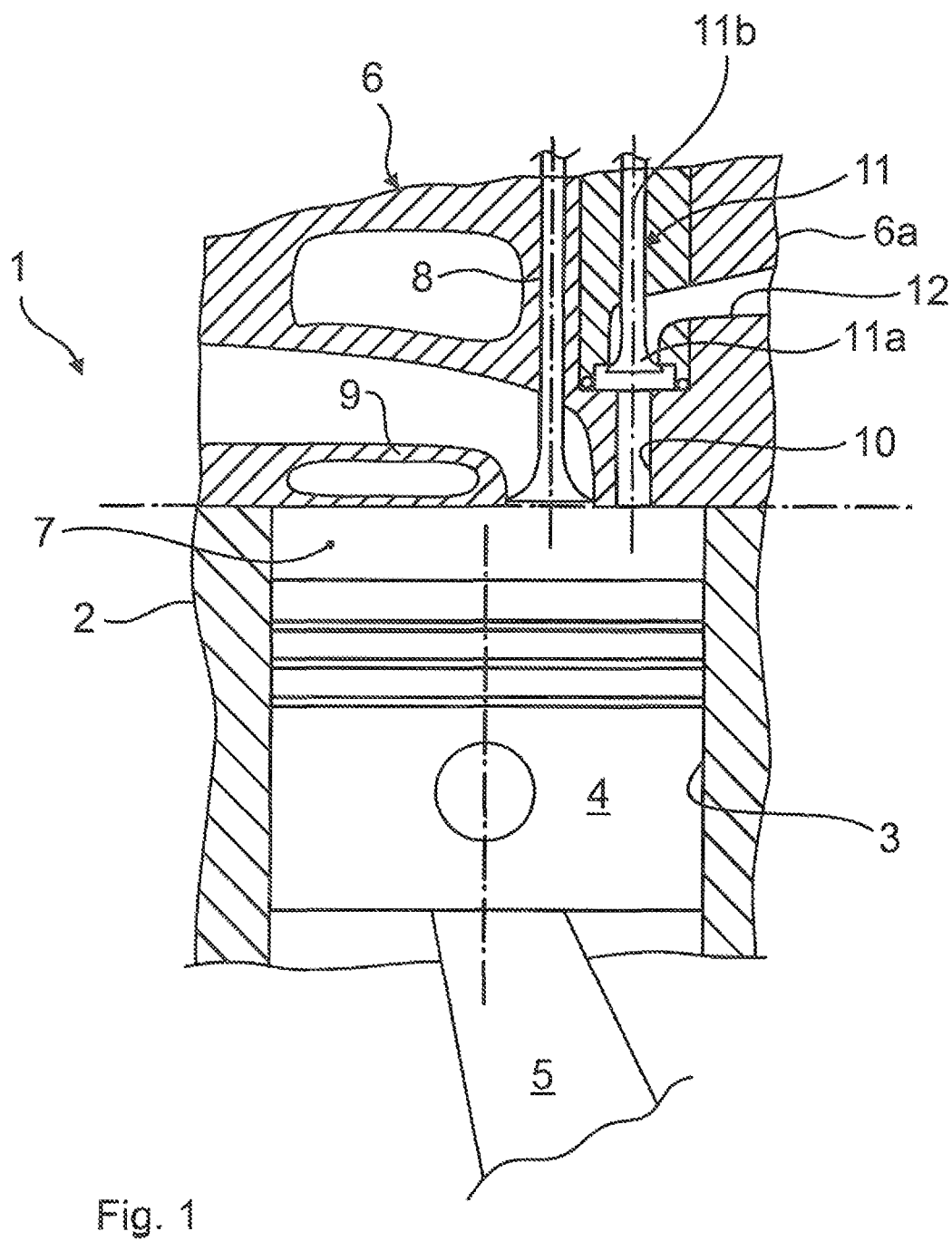
FIG. 1 shows a longitudinal section through a cylinder of an internal combustion engine having a connecting passage opening into the combustion chamber thereof, by means of which connecting passage air subjected to overpressure can be delivered via a controllable valve for a pneumatically actuated apparatus, for example in a commercial vehicle.

FIG. 1 shows in a roughly schematic manner a partial cross section through an internal combustion engine 1, for example in the form of a four-stroke reciprocating piston internal combustion engine, for example for a commercial vehicle as the motor vehicle, comprising a cylinder-crankshaft housing 2, a cylinder bore 3 arranged therein, in which a reciprocating piston 4 is guided and is articulated to a downwardly projecting connecting rod 5, and having a cylinder head 6 mounted in a gas-tight manner on the cylinder-crankshaft housing 2. The internal combustion engine 1 may be, in particular, a diesel engine with correspondingly high compression.

The cylinder-crankshaft housing 2, the reciprocating piston 4 and the cylinder head 6 enclose a combustion chamber 7 which is supplied with combustion air and is connected to exhaust gas conduits via gas exchange valves 8 (inlet and exhaust valves) and corresponding passages 9 in the cylinder head 6.

In addition, a connecting passage 10, which is positioned beside the gas exchange valves 8 and the flow cross section of which is controllable via a valve 11 having a valve head 11a and a valve stem 11b, opens into the combustion chamber 7, which connecting passage 10, in the open state of the valve 11, connects the connecting passage to an outflow channel 12, here, only by way of example, an outflow channel 12 bent through approximately 90° and opening into a lateral face 6a of the cylinder head 6.

A pressure line (not shown) with a non-return valve, which is connected, for example, to a reservoir of the pneumatic service brake of the commercial vehicle, is connected to the outflow channel 12.

In the exemplary embodiment according to FIG. 1, the gas exchange valves 8 and the valve 11 guided in an axially displaceable manner in the cylinder head 6 are arranged parallel to the cylinder central axis and parallel to one another purely by way of example. The valve 11 might also be arranged obliquely in the cylinder head 6 or offset or inclined at an angle of up to 90° to the central axis of the gas exchange valves 8.

By means of the valve 11, air subjected to overpressure which is present in the combustion chamber 7 can be conducted away and delivered via the outflow channel 12 and the pressure line provided with a non-return valve to, for example, the reservoir of the service brake and/or to other pneumatically operated devices.

A recoverable overpressure in the combustion chamber 7 is present, for example, in the coasting mode of the then non-firing internal combustion engine 1, or in the engine-braking mode with, for example, a closed exhaust gas flap in the exhaust system of the internal combustion engine 1, or in defined operating cycles of the internal combustion engine 1 (during the compression stroke prior to ignition of the fuel).

The control of the valve 11, which is preloaded to the closed state by means of a valve spring 13 (FIG. 2), is effected, for example, via an actuating device 14 which is controlled, for example, in a mechanical-hydraulic manner.

Figure 2:
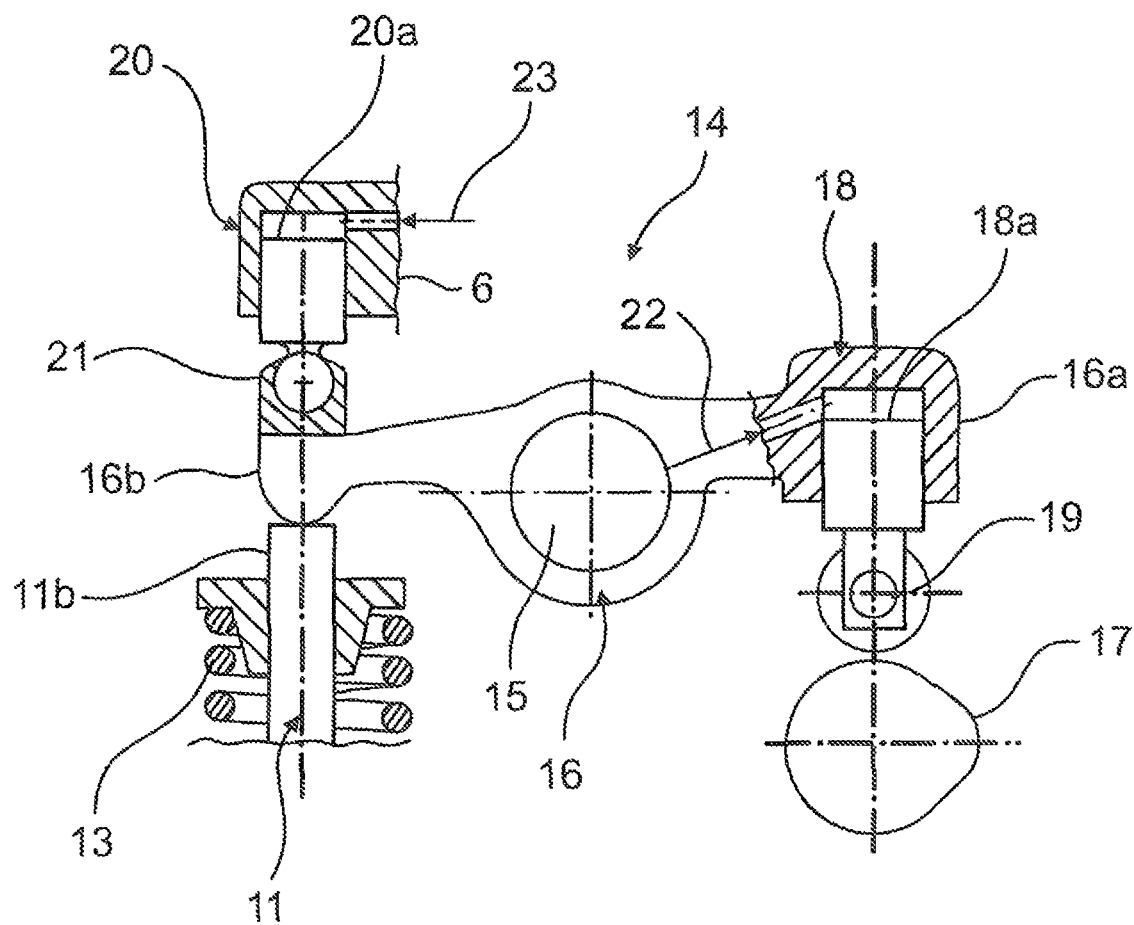
FIG. 2 shows an actuating device of mechanical-hydraulic design which acts on the valve and comprises a camshaft, a rocker lever and two piston-cylinder units integrated in the rocker lever.

In the example of FIG. 2, the actuating device 14 comprises a two-armed rocker lever 16 mounted swivellably in the cylinder head 6 via a spindle 15, one arm 16a of which rocker lever is driven via a cam 17 of a camshaft (not shown further), while its opposite arm 16b acts on the valve stem 11b of the valve 11. It should be noted that a relatively small valve lift of, for example, 1 to 4 mm, preferably of 3 mm, can be sufficient for the functioning of the valve 11.

A piston-cylinder unit 18 includes a piston 18a that cooperates with the cam 17 via a roller tappet 19, as described below, is integrated in the arm 16a of the rocker lever 16. A further piston-cylinder unit 20 is arranged in the cylinder head 6, the piston 20a thereof acting via a ball-jointed thrust piece 21 on the opposite arm 16b of the rocker lever 16.

The pressure chamber of the piston-cylinder unit 18 is connected to a pressurised oil supply, indicated only by the arrow 22, having a control valve (not shown) in such a way that, upon pressurisation, the rocker lever 16 becomes effective, the valve 11 being opened periodically via the cam 17 in defined operating cycles of the internal combustion engine. In the unpressurised state the rocker lever 16 is not actuated and the valve 11 remains closed; no compressed air is drawn off.

Especially in coasting mode, or in engine-braking mode with the exhaust gas flap closed, the valve 11 can be held constantly open via the piston-cylinder unit 20 through corresponding pressurisation of said piston-cylinder unit, which is connected to a pressurised oil supply indicated by the arrow 23. In this operating state the internal combustion engine is not firing and acts, for the one cylinder 3 or, if applicable, for a plurality of cylinders, as a compressor providing a corresponding compressed air delivery as required.

Figure 3:
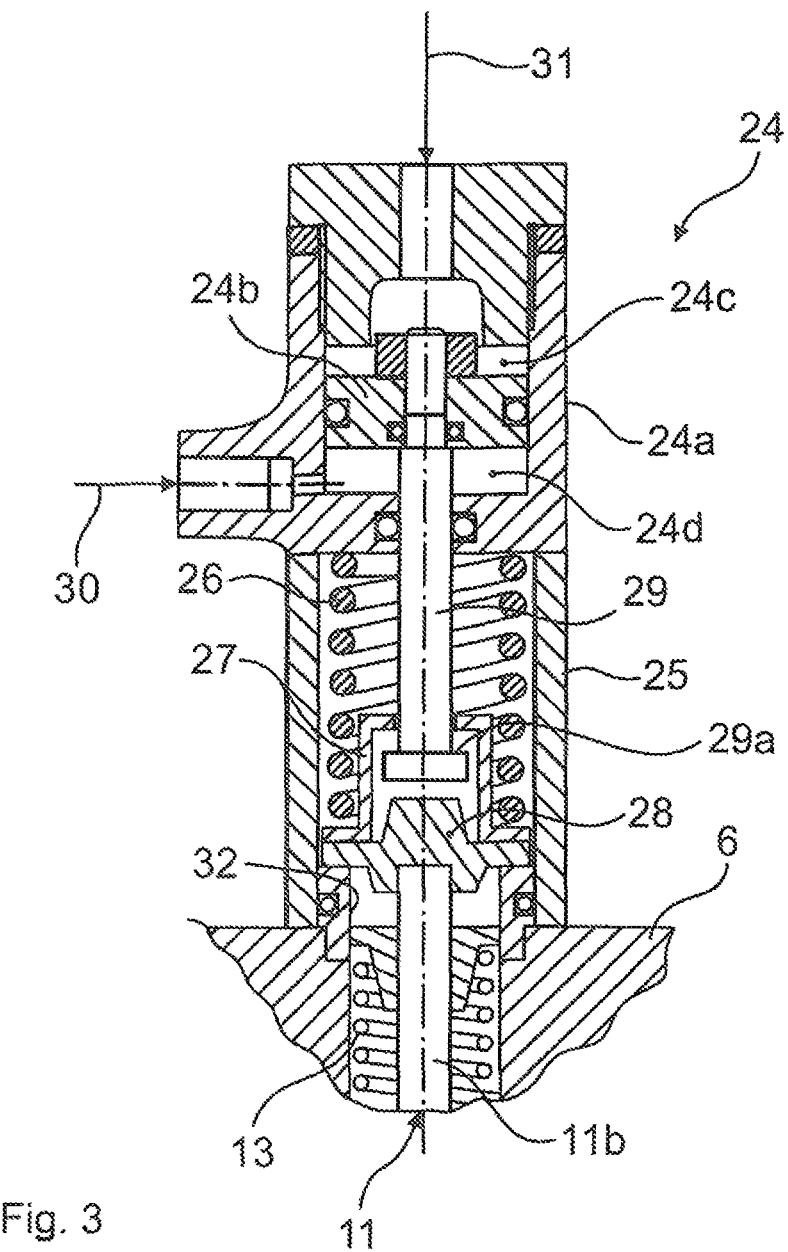
FIG. 3 shows a pneumatically controlled actuating device for the valve, comprising a piston-cylinder unit with a piston which can be acted upon on both sides in dependence on the operating states of the internal combustion engine.

FIG. 3 shows a, for example pneumatically controlled, actuating device 24 alternative to that of FIG. 2, which is formed by a piston-cylinder unit and has a cylinder liner 24a arranged on the cylinder head 6, in which a piston 24b is guided displaceably, pressure chambers 24c, 24d being formed above and below the piston 24b respectively.

A spacer sleeve 25 formed by a separate component, or formed integrally and/or from a single material with the cylinder liner 24a, is provided below the cylinder liner 24a, which spacer sleeve contains a helical compression spring 26 which bears at one end against the cylinder liner 24a and at the other, via a lost-motion cap 27 and a support cup 28, against the valve stem 11b of the valve 11. The pre-tensioning force of the helical compression spring 26 is greater than that of the valve spring 13 so that, in the unpressurised state, the valve 11 is opened in a defined manner. As can be seen in the drawing, in this state the support cup 28 rests against a stop on the spacer sleeve which is formed here, by way of example, by an abutment sleeve 32 (a configuration integral with the wall in the manner of diameter step or a stop ring is, of course, also possible). In addition, the helical compression spring 26 is designed such that, during the compression stroke prior to ignition of the fuel, the valve 11 closes as a result of the increasing combustion chamber pressure.

In addition, the piston 24b of the piston-cylinder unit 24 is coupled, via an actuating rod 29 projecting from the cylinder liner 24a and having a head 29a, to the lost-motion cap 27 in such a way that, starting from the open position of the valve 11 illustrated, during a, for example pneumatically controlled, application of pressure (arrow 30) to the piston 24b via the lower pressure chamber 24d, the lost-motion cap 27 (together with the helical compression spring 26) is pulled upwards and the valve 11 is thereby closed by means of the valve spring 13 which is then operative.

In coasting mode or engine-braking mode the pressure chamber 24c located above the piston 24b is pressurised, for example pneumatically, as indicated by the arrow 31, by means of a control valve (not shown), whereby the piston 24b is moved downwards and holds the valve 11 constantly open via the actuating rod 29 with the head 29a and the support cup 28.

The operation of the actuating device or piston-cylinder unit 24 is substantially as described above; that is to say that in the unpressurised state the valve 11 is opened under spring loading (helical compression spring 26) and can be closed by the combustion chamber pressure, or that the valve 11 is constantly opened through application of pressure to the piston 24b via the pressure chamber 24c. The pneumatic pressure medium source and the required control valves are not represented.

Figure 4:
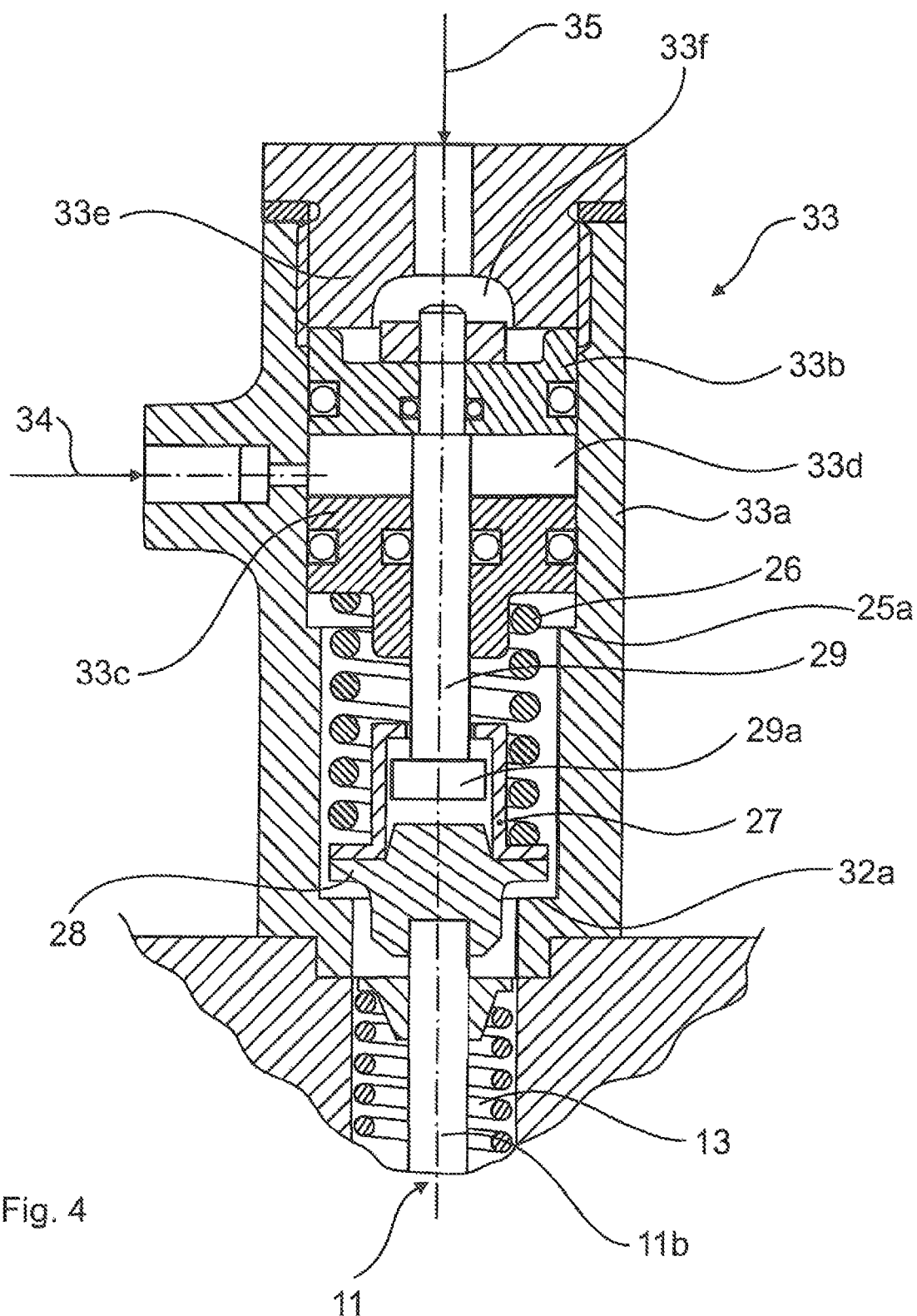
FIG. 4 shows a hydraulically controllable actuating device, alternative to that of FIG. 3, having two pistons acting on the valve.

Finally, FIG. 4 shows a further alternative actuating device or piston-cylinder unit 33, which will be described only insofar as it differs substantially from the actuating device 24 according to FIG. 3. Functionally like parts are designated by the same reference symbols.

The piston-cylinder unit 33 is controllable, for example, hydraulically and has two pistons 33b, 33c guided displaceably in a cylinder liner 33a. The lower piston 33c oriented towards the valve 11 is in the form of an annular piston through which the actuating rod 29 of the upper piston 33b passes.

In the normal position (unpressurised state) shown in FIG. 4, the valve 11 is closed with the pre-tension of the valve spring 13, the two pistons 33b, 33c being arranged and/or dimensioned such that the helical compression spring 26 has no effect and the valve spring 13 therefore acts more or less on its own.

In the event of, for example hydraulically controlled, pressurisation of the lower pressure chamber 33d between the two pistons 33b, 33c (arrow 34), the piston 33c is moved downwards until it comes into abutment with the stop 25a on the cylinder liner, represented here, by way of example, by a diameter step, while the upper piston 33b rests against an annular stop 33e. As this happens the valve 11 is opened by the helical compression spring 26, which has a greater pre-tensioning force than the valve spring 13. The support sleeve 28 rests against a stop 32a in order to ensure a defined valve lift. Compressed air can be drawn from the combustion chamber until the combustion chamber pressure, rising during the compression stroke, closes the valve against the force of the helical compression spring 26.

Constant opening of the valve 11 is achieved if the upper pressure chamber 33f is pressurised (arrow 35), in which case the support cup 28 is subjected to a force via the downwardly displaced piston 33b and its actuating rod 29 or the head 29a thereof, so that the valve 11 is opened constantly (preferably in coasting mode or engine-braking mode). In this case the support cup 28 can again bear against the stop 32a. The lost-motion cap 27 therefore serves here, unlike the case with the embodiment of FIG. 3, primarily to guide the helical compression spring 26, and may be rigidly connected to the support cup 28 or may be a component of the support cup 28.

The pressure control system just described, by way of example, as a hydraulic pressure control system, may be implemented functionally, as described previously, by means of control valves and corresponding pressure medium sources (not shown).

The invention is not restricted to the exemplary embodiments described. In addition to modifications well known to the person skilled in the art, the valve 11 may also be actuated or opened and closed partially or wholly by electrical means.

LIST OF REFERENCES

1 Internal combustion engine
2 Cylinder-crankshaft housing
3 Cylinder
4 Reciprocating piston
5 Connecting rod
6 Cylinder head
6a Lateral face
7 Combustion chamber
8 Gas exchange valve
9 Inlet or exhaust port
10 Connecting passage
11 Valve
11a Valve head
11b Valve stem
12 Outflow channel
13 Valve spring
14 Actuating device
15 Spindle
16 Rocker lever
16a Arm
16b Arm
17 Cam
18 Piston-cylinder unit
18a Piston
19 Roller tappet
20 Piston-cylinder unit
20a Piston
21 Thrust piece
22, 23 Pressure supply
24 Actuating device
24a Cylinder liner
24b Piston
24c Pressure chamber
24d Pressure chamber
25 Spacer sleeve
25a Stop
26 Helical compression spring
27 Lost-motion cap
28 Support cup
29 Actuating rod
29a Head
30, 31 Pressure supply
32 Abutment sleeve
32a Stop
33 Actuating device
33a Cylinder liner
33b Piston
33c Piston
33d Pressure chamber
33e Stop
33f Pressure chamber
34, 35 Pressure supply

The invention claimed is:

1. A device for delivering compressed air for pneumatically operated equipment in motor vehicles, comprising:
    a controllable valve arranged outside of a combustion chamber of at least one cylinder of an internal combustion engine, whereby compressed air can be tapped via the controllable valve from the combustion chamber; and
    an actuating device controlling the valve,
    wherein the controllable valve is preloaded by a valve spring, and the actuating device for the controllable valve is a piston-cylinder unit having at least one piston applying a force in at least one of an opening direction and a closing direction,
    the piston-cylinder unit further comprises a cylinder liner, the at least one piston being guided displaceably in the cylinder liner and defining an upper pressure chamber on a first side of the at least one piston facing away from the controllable valve and a lower pressure chamber on a second side of the at least one piston facing the controllable valve, and
    a spring device arranged on the second side of the piston, the spring device having a first side bearing indirectly or directly against the cylinder liner and acts with a second side on the controllable valve, the pre-tensioning force of the spring device being designed such that it is greater than the force of the valve spring preloading the controllable valve to the closed position, and in that the spring device can be brought out of the engagement during the compression stroke prior to ignition of the fuel and above a defined combustion chamber pressure, so that the controllable valve is closed by the valve spring.

2. The device according to claim 1, wherein the controllable valve is arranged in a cylinder head of the internal combustion engine set back from a combustion chamber surface on a cylinder head side.

3. The device according to claim 2, wherein the controllable valve is aligned substantially parallel to gas exchange valves of the internal combustion engine.

4. The device according to claim 3, wherein the gas exchange valves and the controllable valve are arranged parallel to a central axis of the at least one cylinder of the internal combustion engine.

5. The device according to claim 1, wherein the controllable valve is further connected to an outflow channel, which is controllable via the controllable valve, the outflow channel opening into a lateral face of the cylinder head where the outflow channel is connectable to a pressure line.

6. The device according to claim 1, wherein the actuating device controls the controllable valve one of mechanically, electrically, hydraulically and pneumatically.

7. The device according to claim 6, wherein the actuating device includes an actuating element operated by a cam driven by the internal combustion engine, the actuating element opening the controllable valve at least temporarily via the cam, and a control element actuatable to override the actuating element and hold the valve constantly open.

8. The device according to claim 7, wherein the actuating element includes a two-armed rocker lever with a first arm and a second arm and which is driven via the cam, and two control elements respectively acting on the first arm and the second arm.

9. The device according to claim 6, wherein the at least one piston is connectable, in dependence on different operating states of the internal combustion engine, to at least one pressure medium source or control valve to control the controllable valve.

10. The device according to claim 1, wherein the spring device is arranged in a spacer sleeve between the cylinder liner and the controllable valve.

11. The device according to claim 1, wherein the spring device acts on the controllable valve via a lost-motion cap or a lost-motion cap with an associated support cup, the lost-motion cap being mounted displaceably on and being couplable to an actuating rod connected to the at least one piston such that, upon pressurisation of lower pressure chamber and a resulting displacement of the piston away from the controllable valve, the lost-motion cap is moved away from the controllable valve and the spring device is thereby brought out of operative engagement and the controllable valve closes as a result of the force of the valve spring, and
   upon pressurisation of the upper pressure chamber or with the upper and lower pressure chambers unpressurised, displacement of the lost-motion cap by the spring device relative to the actuating rod is enabled, whereby the spring device pre-tensions the lost-motion cap toward the controllable valve and acts on the controllable valve against the force of the valve spring.

12. A device for delivering compressed air for pneumatically operated equipment in motor vehicles, comprising:
   a controllable valve arranged outside of a combustion chamber of at least one cylinder of an internal combustion engine, whereby compressed air can be tapped via the controllable valve from the combustion chamber; and
   an actuating device controlling the valve,
   wherein the controllable valve is preloaded by a valve spring, and the actuating device for the controllable valve is a piston-cylinder unit having at least one piston applying a force in at least one of an opening direction and a closing direction,
   wherein the at least one piston includes a first piston and a second piston which can be acted upon in opposite directions, the first piston actuatable to hold the controllable valve constantly open in defined operating states of the internal combustion engine, and the second piston actuatable to open the controllable valve periodically in defined operating states of the internal combustion engine.

13. The device according to claim 12, wherein a pressure chamber is arranged and formed between the first piston and the second piston such that the second piston is displaced toward the controllable valve upon pressurisation of the pressure chamber until the second piston comes into abutment against a stop,
   a spring device acts on the controllable valve and bears against a side of the second piston oriented towards the controllable valve, the pre-tensioning force of the spring device being greater than that of the valve spring which preloads the controllable valve to the closed position, the pre-tensioning force of the spring device additionally being designed such that the spring device can be brought out of the engagement, in particular can be compressed, during the compression stroke of the internal combustion engine prior to ignition of the fuel and above a defined combustion chamber pressure, so that the controllable valve is closed by the valve spring.

14. The device according to claim 13, wherein an actuating rod connected to the first piston passes through the second piston, such that the second piston and the actuating rod are displaceable relative to one another,
   upon pressurisation of the pressure chamber between the first piston and the second piston, the first piston and the second piston are displaced in a defined manner, such that the spring device acts on the controllable valve,
   and in that the first piston, together with the actuating rod, is designed such that, upon application of pressure to the first piston towards the controllable valve, the actuating rod acts on the controllable valve and continuously opens the controllable valve against the force of the valve spring.

15. The device according to claim 13, wherein the first piston and the second piston are accommodated and arranged in the piston-cylinder unit in such a way that the spring device is inoperative in the unpressurised state and that the valve is closed by means of the preloading force of the valve spring.

16. A vehicle, comprising a device according to claim 1.

17. A method for delivering compressed air for pneumatically operated equipment in motor vehicles, using a device according to claim 1.

18. The device according to claim 12, wherein the controllable valve is arranged in a cylinder head of the internal combustion engine set back from a combustion chamber surface on a cylinder head side.

19. The device according to claim 18, wherein the controllable valve is aligned substantially parallel to gas exchange valves of the internal combustion engine.

20. The device according to claim 19, wherein the gas exchange valves and the controllable valve are arranged parallel to a central axis of the at least one cylinder of the internal combustion engine.

21. The device according to claim 12, wherein the controllable valve is further connected to an outflow channel, which is controllable via the controllable valve, the outflow channel opening into a lateral face of the cylinder head where the outflow channel is connectable to a pressure line.

22. The device according to claim 12, wherein the actuating device controls the controllable valve one of mechanically, electrically, hydraulically and pneumatically.

23. The device according to claim 22, wherein the actuating device includes an actuating element operated by a cam driven by the internal combustion engine, the actuating element opening the controllable valve at least temporarily via the cam, and a control element actuatable to override the actuating element and hold the valve constantly open.

24. The device according to claim 23, wherein the actuating element includes a two-armed rocker lever with a first arm and a second arm and which is driven via the cam, and two control elements respectively acting on the first arm and the second arm.

25. The device according to claim 22, wherein the at least one piston is connectable, in dependence on different operating states of the internal combustion engine, to at least one pressure medium source or control valve to control the controllable valve.

26. A vehicle, comprising a device according to claim 12.

27. A method for delivering compressed air for pneumatically operated equipment in motor vehicles, using a device according to claim 12.

* * * * *